United States Patent [19]
Tyler et al.

[11] Patent Number: 5,344,025
[45] Date of Patent: Sep. 6, 1994

[54] COMMINGLED WASTE SEPARATION APPARATUS AND METHODS

[75] Inventors: Mike W. Tyler, Louisville; Franklin E. Whitson, Jeffersontown, both of Ky.

[73] Assignee: Griffin & Company, Louisville, Ky.

[21] Appl. No.: 690,621

[22] Filed: Apr. 24, 1991

[51] Int. Cl.⁵ .............................................. B07B 9/00
[52] U.S. Cl. ...................................... 209/35; 209/37; 209/38; 209/44.2; 209/930
[58] Field of Search ............... 209/12, 930, 44.1, 44.2, 209/136, 137, 138, 139.1, 133, 212, 38, 34, 35, 36, 37, 30, 31, 240, 629, 630, 631, 632; 241/DIG. 38

[56] References Cited

U.S. PATENT DOCUMENTS

| | | | |
|---|---|---|---|
| 974,395 | 11/1910 | Kidder | 209/642 |
| 1,312,867 | 8/1919 | Patterson et al. | 209/12 |
| 1,530,277 | 11/1922 | Mettler, Sr. | 209/137 |
| 1,888,372 | 11/1932 | Bramwell | 209/139.1 |
| 1,962,668 | 6/1934 | Olney | 209/136 |
| 2,132,961 | 10/1938 | Morgan | 209/139.1 |
| 3,164,548 | 1/1965 | Rowell et al. | 209/139.1 |
| 3,240,335 | 3/1966 | Vandenhoeck | 209/136 |
| 3,370,705 | 2/1968 | Grulke | 209/240 |
| 3,409,025 | 11/1968 | Wochnowski | 209/139.1 X |
| 3,608,716 | 8/1971 | Rowell et al. | 209/139.1 |
| 3,655,043 | 4/1972 | Wochnowski et al. | 209/138 |
| 3,802,558 | 4/1974 | Rhys | 209/930 X |
| 4,264,352 | 4/1981 | Houser | 209/12 X |
| 4,465,194 | 8/1984 | Coleman | 209/639 |
| 4,618,415 | 10/1986 | Vecchio et al. | 209/134 |
| 4,755,284 | 7/1988 | Brooks et al. | 209/139.1 X |
| 4,831,922 | 5/1989 | Cogan et al. | 356/376 X |
| 4,834,870 | 5/1989 | Osterberg et al. | 209/212 X |
| 4,844,351 | 7/1989 | Holloway | 209/930 X |
| 4,894,148 | 1/1990 | Frei | 209/930 X |
| 4,915,824 | 4/1990 | Surtees | 209/139.1 |
| 4,929,342 | 5/1990 | Johnston | 209/139.1 X |
| 5,009,370 | 4/1991 | MacKenzie | 209/930 X |
| 5,024,335 | 6/1991 | Lundell | 209/930 X |
| 5,074,992 | 12/1991 | Clinton | 209/12 |
| 5,078,274 | 1/1992 | Brown | 209/629 X |
| 5,116,486 | 5/1992 | Pederson | 209/12 |

FOREIGN PATENT DOCUMENTS

| | | | |
|---|---|---|---|
| 55088 | 11/1974 | Australia | 209/139.1 |
| 342389 | 11/1989 | European Pat. Off. | 209/930 |
| 626782 | 6/1934 | Fed. Rep. of Germany | 209/137 |
| 630756 | 6/1936 | Fed. Rep. of Germany | 209/137 |
| 828904 | 6/1938 | France | 209/137 |
| 47566 | 1/1940 | Netherlands | 209/137 |
| 413294 | 7/1934 | United Kingdom | 209/137 |
| 755252 | 8/1956 | United Kingdom | 209/138 |

Primary Examiner—David H. Bollinger
Attorney, Agent, or Firm—Wood, Herron & Evans

[57] ABSTRACT

Separation apparatus and methods separate ferrous, glass, plastic and aluminum articles in kind from each other when all articles are presented in a commingled stream. Ferrous articles are first removed by magnetic apparatus. The remaining commingled stream of glass, plastic and aluminum articles are conveyed over a vibratory screen for removal or residue materials not first removed prior to ferrous article separation. Plastic and aluminum articles are lifted away from glass articles in a vertically moving air column of a closed loop air flow system. The glass is conveyed past the column for further separation and collection while the plastic and aluminum articles are discharged together from a centrifugal classifier portion of the closed air loop. Large plastic articles are first removed from the combined plastic and aluminum, then aluminum articles are separated from the remaining smaller plastic articles. Aluminum articles are collected while the larger and smaller plastic articles are recombined, compacted and collected. Plastic and aluminum are alternately separated by a trommel. Alternative component layouts are disclosed.

8 Claims, 6 Drawing Sheets

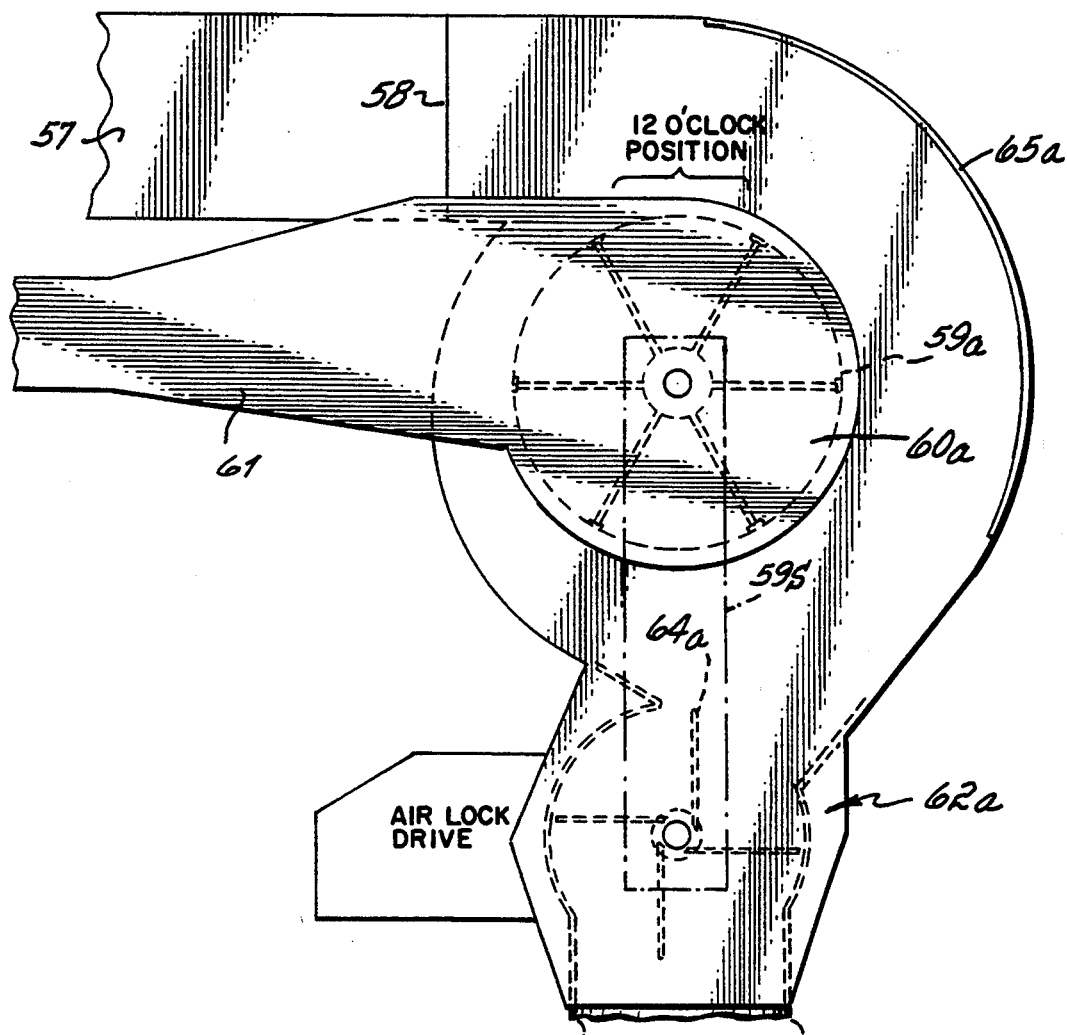
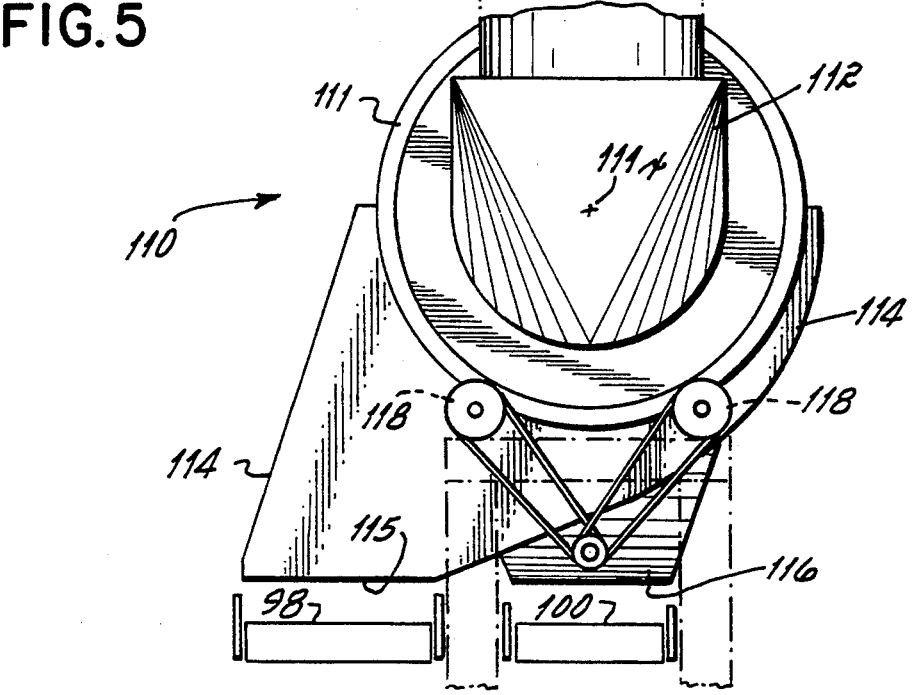
FIG. 5

COMMINGLED WASTE SEPARATION APPARATUS AND METHODS

This invention relates to waste recycling and in particular to apparatus and processes for separating and collecting ferrous, glass, plastic and aluminum articles from a commingled stream of such articles.

Many recycling projects are now underway across the United States as a way of protecting the environment from excessive waste disposal. Such processes generally involve the separation and collection of waste articles of similar materials at a "MRF" or Material Recovery Facility, and their recycling with similar materials into new goods.

In general, waste products of the type here considered are those made of ferrous, glass, plastic and aluminum. These include for example, steel and tin cans; amber, green and clear (or flint) glass; plastic bottles, jugs and containers and aluminum cans.

While various existing projects involve individual persons separating various articles into separate containers at the point the articles are used, a major difficulty is currently presented by the desire to separate and collect such components from huge agglomerations of non-separated or commingled waste products. It has been highly desirable to provide a process by which the various components of such agglomerations can be efficiently separated and collected at flow rates and costs which render such processes economically feasible.

In the past, separation of such agglomerated components has been achieved by time consuming, expensive methods. For example, separation has been done manually, a process which is far too time-consuming and costly. In another method, a stream of commingled articles has been dropped through the air while air streams are directed across the articles to blow the lighter ones away from the heavier falling articles, much in the same manner as the biblical process of removing chaff from wheat by casting the mix to the winds. In still another process, heavy chains were drug across a commingled stream of articles to drag off the lighter plastic and aluminum articles from the heavier glass and metal. All these processes are either very expensive and/or do not provide the separation flow-through rates desired. Still other processes have not been entirely satisfactory or sufficiently cost efficient.

Many forms of apparatus and processes have been used in the past to classify finer or lighter from heavier particles or materials in other industries. Such other apparatus and processes are not believed suitable for separation of ferrous, glass, plastic and aluminum articles. One such prior device is the pneumatic tobacco classifier shown in U.S. Pat. No. 4,915,824. In such device, intermixed light leaf and heavier stem tobacco particles are cast across a chamber in an arc-shaped projected stream. Air streams of varying velocities are directed against the stream to separate the lights from heavier particles. The heavier particles fall into a discharge chute across the chamber, while the lights are carried by the air to a centrifugal separator and are discharged through an air lock.

Such apparatus has worked well for tobacco particles but would not be suitable for separating ferrous, glass, plastic and aluminum articles of the sizes and weights normally encountered in an agglomeration of waste materials which must be separated for recycling. Projection of a commingled stream of such articles would cause breakage of the glass, and it is not apparent that certain components could be separated from others in such a system. Also, agglomerations of recyclable waste materials typically include undesirable residue materials in a vast array of sizes and weights. Such residue materials must also be separated from the ferrous, glass, plastic and aluminum articles. Thus, apparatus for separation of other products is not helpful to or suggestive of apparatus or methods for handling recyclable articles of the type noted.

Accordingly, it has been one objective of this invention to provide improved apparatus and methods for separating ferrous, glass, plastic and aluminum articles from a commingled stream of such agglomerated articles.

A further objective of this invention has been to provide improved apparatus and methods for separating aluminum and plastic articles from glass articles, all of which are presented in a commingled stream of articles.

A further objective of this invention has been to provide improved apparatus and methods for separating plastic and aluminum articles from glass articles where all such articles are in a commingled stream.

A further objective of this invention has been to provide improved apparatus and methods for separating plastic articles from aluminum articles presented in a commingled stream of such articles.

To these ends, a preferred embodiment of the invention includes apparatus for receiving a commingled stream of ferrous, glass, plastic, aluminum and undefined residue articles, and for conveying such commingled stream of articles through progressive separation stations for respectively separating pluralities of the same kind of articles from the stream so that different kinds of articles can be separately collected. Such a commingled stream includes, for example, the following components:

Ferrous—steel and tin cans
Aluminum—aluminum cans
Plastics—High density polyethylene (H.D.P.E.) such as milk jugs;
  Polyethylene terephthalate (P.E.T.) such as 1 and 2 liter beverage containers;
  and other plastic articles, i.e. liquid detergent containers, etc.
Glass—Amber, clear (or flint) and green glass articles;
Residue—Possibly foreign materials such as dirt, paper, etc.

The commingled stream is first conveyed past individual operators for manual residue removal and then past a magnetic separator which removes ferrous materials. From there the stream is expanded on a vibratory screen for removal of further residue articles and smaller or mixed broken glass pieces. The remaining commingled stream of glass, plastic and aluminum articles is then concentrated by a narrowing section of screen conveyor and introduced to a porous surface conveyor extending across a perpendicularly moving, upward flowing portion of air traveling in a closed loop system. The air column lifts lighter plastic and aluminum articles from glass articles in the stream; the glass being conveyed beyond the closed loop column where its components are further separated and collected.

The lifted plastic and aluminum articles travel in the air column within the closed loop to a separator such a rotating screening separator or a centrifugal separator where they are discharged from the loop through an air lock. A rotating screening separator is particularly useful where the stream at this point includes light foreign articles such as plastic bags which the screening separator prevents from traveling to the fan. The cleared air flow is directed back to a fan intake from where it is continuously directed onto the moving commingled stream.

A portion of the air flow is removed or taken off via a dust skimmer which serves two purposes; one to maintain a negative pressure in the closed loop system and another to skim off dust particles present in the air stream, thus maintaining a clean air stream.

The discharged plastic and aluminum article stream at this point comprises primarily large and small plastic articles and aluminum. These are separated in two phases. First, the larger plastic articles are separated from the stream by conveying the stream over a plurality of bars which are spaced to allow the smaller plastic articles and aluminum to drop away from the larger plastic articles. These larger articles are conveyed away from the remaining commingled stream.

Such plastic and aluminum are alternately separated at this point by using a trommel which screens or passes the aluminum cans, but not the plastic (other than very small plastic articles). The resulting aluminum and any small plastic articles can be further separated by an eddy current separator as mentioned below.

A stream of smaller plastic articles and aluminum is directed to the discharge end of a conveyor associated with an eddy current non-ferrous metal separator. The plastic articles drop off the end of the conveyor while the aluminum articles are kicked out in a flatter trajectory; the plastic and aluminum articles falling on respective adjacent parallel conveyors. The aluminum is collected, while the plastic articles are recombined with the larger plastic articles for respective collection after compaction. Perforation of the plastic, prior to compaction, can be performed if desired.

The closed loop air flow is particularly useful to separate plastic and aluminum articles from heavier glass articles. While the porous conveyor surface is of sufficiently large area to handle significant stream flow, the ascending air column is progressively confined to increase velocity, without undue power drain, to effectively remove and convey plastic and aluminum articles while leaving heavier glass. Use of the centrifugal or screen separator and closed loop air flow facilitates operation, reduces effluent, which may contain dust, and facilitates separation at sufficiently low cost.

The porous surface at the air lift or separation station is slightly inclined downwardly from upstream to downstream ends, while the drop to it from the introducing vibrating screen, and the drop to the glass discharge conveyor from the porous plate are minimized to reduce glass breakage.

If desired, the air flow moving upwardly across the commingled stream can be divided into a plurality of air streams, each directed across the commingled stream. A first higher velocity air flow stream contacts the commingled article stream prior to contact thereof by lower velocity air flow streams. All such air flow streams combine in upper portions of the air column for entraining and conveying lifted plastic and aluminum articles.

Flow rates already attained by the invention have reached, for example, 10 to 15 tons per hour with a closed loop air flow about 3 feet across at interface with the commingled stream. For this result, an air flow of about 21,000 cfm is used across the commingled stream at a velocity of about 2100-2300 fpm. The parameters are suitable to separate constituents of the stream including heavier plastic articles like liquid detergent bottles. An air flow of about 18,000 cfm is used at a velocity of about 1800-2000 fpm when such heavier plastic articles are not anticipated in the stream.

It will thus be appreciated that the invention provides improved apparatus and methods for separating ferrous, glass, plastic and aluminum articles from each other for separate collection and subsequent recycling. Further advantages, details and modifications will be readily apparent from the following detailed description of a preferred embodiment and from the drawings in which:

FIG. 5 is an elevational view similar to a portion of FIG. 3, but illustrating diagrammatically features of a rotating screen separator and an associated "trommel";

SYSTEM LAYOUT

Figure 1:
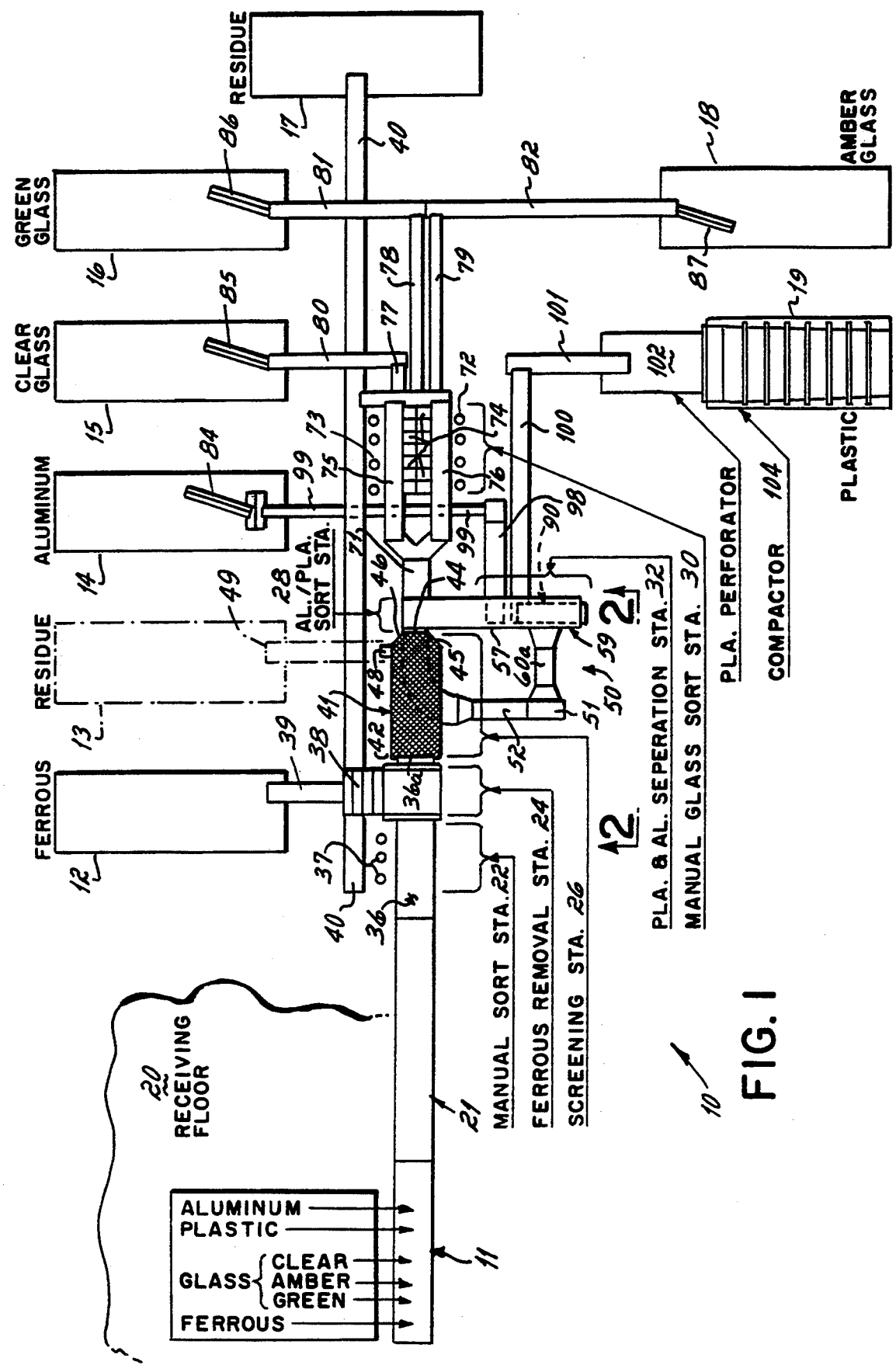
FIG. 1 is a diagrammatic plan view or flowchart illustrating the invention.

Turning now to the drawings, a diagrammatic plan view of the preferred embodiment of the invention in FIG. 1 illustrates a complete system for receiving a commingled stream of varying components and for separating and collecting those components. The system 10 receives a commingled stream of various recyclable ferrous, glass, plastic and aluminum articles as described above in the summary of the invention, onto conveyor 11 and is operable to separate the components and collect like components in large "roll-off" containers, such as 40 cubic yard roll-off containers which can be used to transport the articles to recycling facilities. These containers are illustrated at 12–19. As will be mentioned, container 13 is optional.

Alternately, the separated ferrous, aluminum and plastic constituents are baled and are discharged for transfer to recycling facilities.

Container 12 is positioned for receiving ferrous articles separated by the system 10. Optional roll-off container 13 is positioned for receiving residue materials ejected from the system. Roll-off container 14 is located to receive aluminum articles. Container 15 is oriented to receive clear (or flint) glass articles. Container 16 is oriented to receive green glass articles. Container 17 is oriented to also receive residue materials. Container 18 is oriented to receive amber glass materials or articles. Container 19 is oriented to receive plastic articles.

The articles making up the commingled stream generally include ferrous material such as steel and tin cans, a plurality of different glass articles, such as clear (or flint), green or amber glass, various ones of which are used for example, in various beverage and other containers, plastic articles such as high density polyethylene and polyethylene terephthalate articles such as found in milk jugs, soft drink containers and the like, and other plastic articles such as liquid detergent bottles, and aluminum articles, such as aluminum cans, together with an residue materials which have found their way into the agglomeration of the mixed articles. It will be appreciated that this indiscriminate mixture of articles is retrieved from collection points and can be dumped, for example, on a receiving floor 20. The articles from there are loaded, such as by a Bobcat loader, receiving and delivery chute or other means, onto the receiving conveyor 11.

Receiving conveyor 11 is preferably a chain conveyor, for example, and is positioned for receiving, as noted above, the commingled agglomeration of articles and for conveying them in a commingled stream into the system 10. Other devices and systems for feeding a commingled stream onto conveyor 11 could be utilized and it will be appreciated, for example, that partially separated articles could also be introduced to conveyor 11 for further classification or separation.

From the receiving or loading conveyor 11, the commingled stream of articles is transferred to an in-line conveyor 21 which serves to transport the articles from the receiving area to a first manual sort station 22 when foreign or residue articles are manually removed. From there, the remaining commingled stream is transferred to a ferrous removal station 24 for removing articles containing ferrous material. The remaining stream is then transferred to a screening station 26, at which point the remaining commingled stream comprises generally glass, plastic and aluminum articles. Further residue is removed therefrom by passing through a screen at station 26. From the screening station 26, the remaining commingled stream is introduced to a closed loop air flow station 28 for removing plastic and aluminum articles from glass articles. The glass is conveyed from station 28 to a glass sort station 30 while the remaining combined plastic and aluminum articles are lifted away from glass at station 28, in the closed loop system, and transferred to a plastic and aluminum separation station 32.

SYSTEM DETAILS

Returning now to the in-line conveyor 21 in FIG. 1, further details of the various separating apparatus and methods will now be described. As noted, the commingled stream is conveyed by conveyor 21 to a first sort station 22. First sort station 22 includes a generally horizontal belt or other type conveyor 36, receiving the commingled stream from conveyor 21. A plurality of individual operators, indicated at 37, are positioned near the conveyor 36, so that as the commingled stream passes, they can manually remove undesirable residue materials and place them on the residue conveyor 40. That conveyor 40 extends from the left- to the right-hand side of FIG. 1 for conveying and depositing residue materials into the residue roll-off container 17.

Conveyor 36 carries the commingled stream beneath a magnetic ferrous article removal station 24. This station includes an overhead magnetic belt apparatus 25 with, for example, a 5 horsepower drive, and can be of any suitable type. One suitable such unit, for example, is model number SE 7725, purchased from the Eriez Company of Erie, Pa. The magnetic belt of the ferrous removal station 24 moves in a direction transverse to the machine direction of the belt conveyor 36. When current is applied, the apparatus 25 attracts ferrous material in the combined stream upwardly and away from the remaining articles on conveyor 36. The ferrous articles are then transferred through a baler 38 which flattens and compresses the articles into a bale. The bales may then be discharged onto a conveyor 39 for transfer into the roll-off container 12 for steel articles, or simply discharged for loading or transfer to further ferrous recycling facilities. Any suitable ferrous article baler can be used.

After passing the ferrous removal station 24, the combined stream is conveyed to the discharge end 36a of the conveyor 36 and deposited onto a vibrating screen conveyor 41, defining the screening station 26. Screen conveyor 41 has an upstream end 42, which is wider than the discharge end 44. When the combined stream is discharged from the discharge end 36a onto the screen 41, the stream of articles is no longer confined between the conveyor walls 43, for example, of conveyor 36. The stream thus expands outwardly and transversely across the screen 41. At the same time, the screen 41 is driven by a vibrating mechanism for conveying the remainder of the combined stream, still including glass, plastic and aluminum articles, from the upstream end 42 to the downstream end 44 thereof. The vibrating screen conveyor is model number VS-60144 manufactured by Griffin & Company of Louisville, Ky., and includes mesh openings of about 2 inch squares for permitting further residue and undesirable articles to fall therethrough.

It will be noted that the downstream end 44 of screen 41 is quite a bit narrower than the upstream end 42 of the vibrating screen conveyor 41. Thus, as the combined stream moves from the upstream end 42 to the downstream end 44, it is first expanded (from conveyor 36) and then concentrated by the tapering guides 45 and 46, at the downstream end 44, for introduction to the closed air loop separation station 28, as will be further described.

The vibrating screen apparatus 41 includes a bottom plate 47. When residue material falls through the screen, it lands on the plate 47 and is conveyed to a discharge chute 48, from where it is introduced to a discharge conveyor 49 for transfer to the optional roll-off residue container 13. It will be appreciated that the roll-off residue container 13 is optional and can be eliminated. For example, if the stream is guaranteed free of residue, if residue is otherwise removed, or if residue is deposited directly on conveyor 40, container 13 will not be needed. The chute 48, for example, could simply be extended to deposit residue on the adjacent residue conveyor 40 for ultimate deposit in the residue roll-off container 17.

From the discharge end 44 of vibrating screen 41, the commingled stream, still including glass, plastic and aluminum articles, is introduced to a closed air loop separation station 28, where the aluminum and plastic articles are lifted from the glass articles and carried away by a moving column of air. Thereafter, the glass articles are conveyed away from station 28 for further sortation and classification, while the combined stream of plastic and aluminum articles are also conveyed by the air to a discharge from the closed air loop for further separation.

Figure 2:
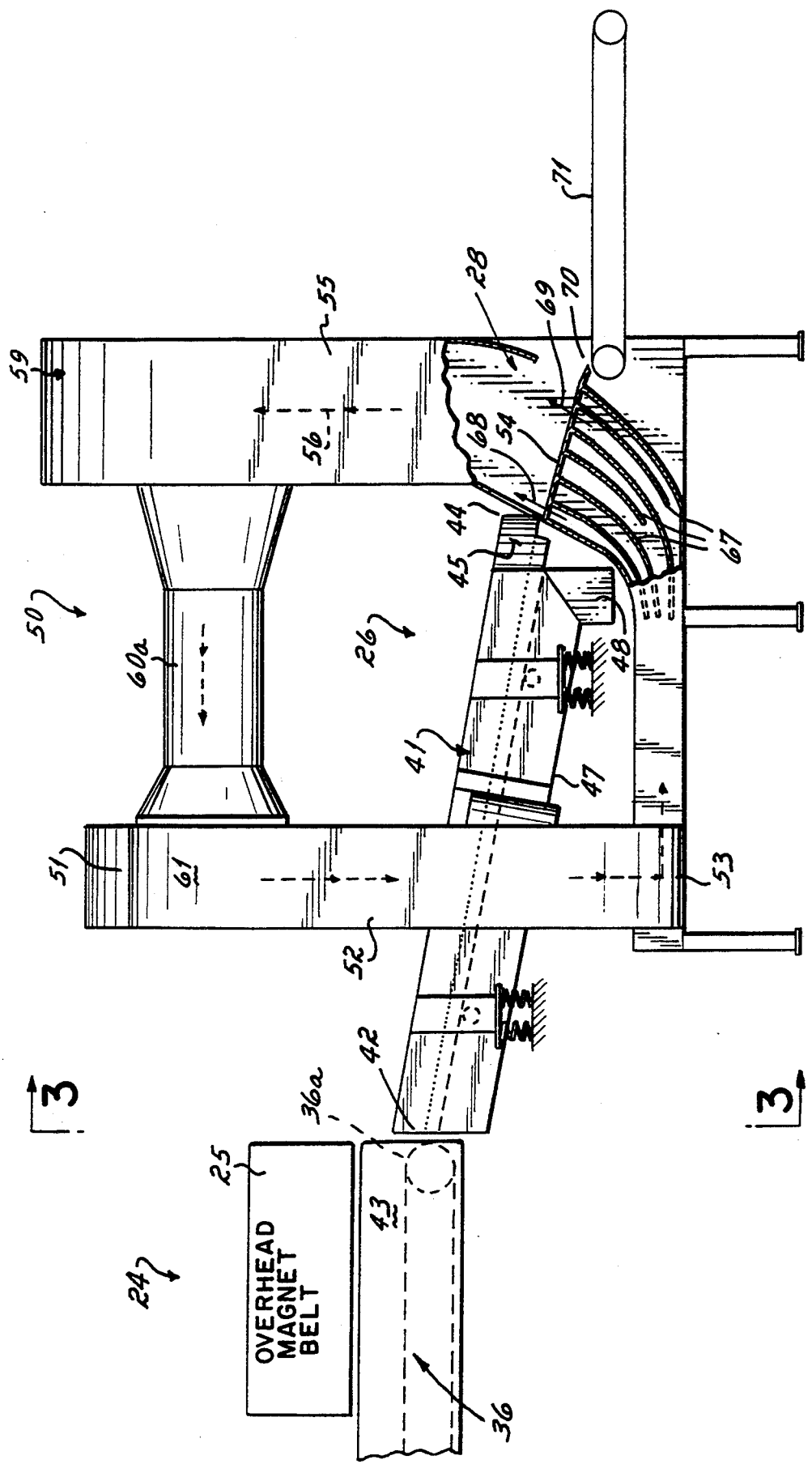
FIG. 2 is an elevational view taken along lines 2—2 of FIG. 1 and showing further detail of the apparatus thereof.
Figure 3:
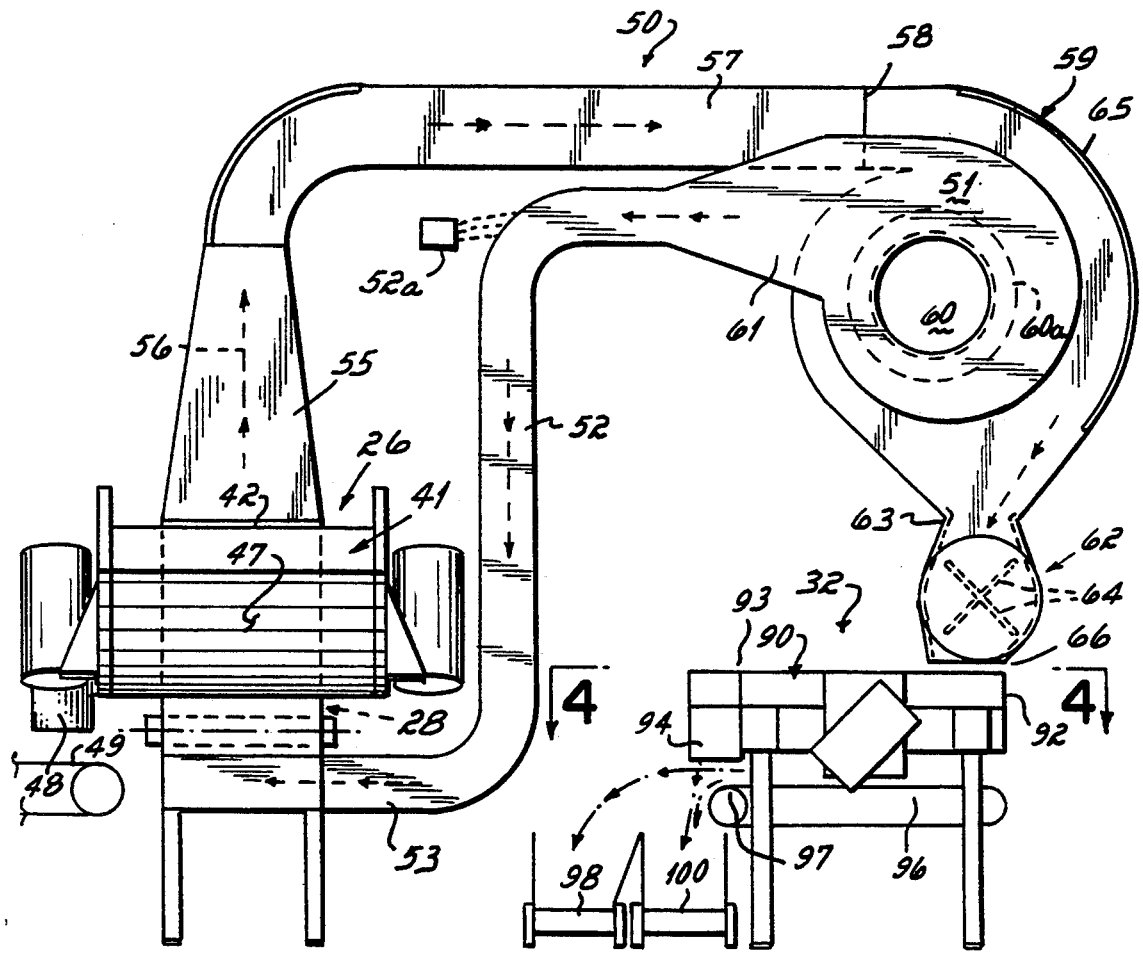
FIG. 3 is an elevational view taken along lines 3—3 of FIG. 2.

Perhaps the details of the closed loop air separation apparatus are best seen in FIGS. 2 and 3. In FIG. 2, it will be appreciated that the commingled stream has been discharged from conveyor 36, across screen 41 at discharge end 44 into the station 28.

Station 28 is defined, in part, by a closed loop air separator 50. Essentially, the combined stream is conveyed through the station 28 and a closed loop of moving air, a portion of which defines an upwardly air flow or column, is directed from beneath the combined stream, through it and upwardly to lift off the lighter plastic and aluminum articles from the glass articles. The combined plastic and aluminum articles are then entrained in the air flow and conveyed to a rotary screen separator or a centrifugal classifier where the aluminum and plastic articles are discharged through an air lock and the air returns to the blower intake for further upward impingement on the moving commingled stream, all in a closed loop configuration.

The closed loop separator 50 thus includes a blower 51, and a duct 52 connected from an exhaust of the blower to a horizontal duct 53 at a lower end thereof. Duct 53 extends beneath an inclined, commingled stream receiving perforated plate 54. Discharge end 44 of screen 41 and plate 54 are disposed to minimize the drop of the stream to the plate.

A dust skimmer diagrammatically indicated at 52a (FIG. 3) is provided for venting a portion of the air to maintain a negative pressure in the loop and to remove dust from the air loop.

Air exhausting from the blower is conducted through the duct 52 to the duct 53 and from there upwardly through the perforated plate 54 into the tapered or converging duct 55, defining an upwardly moving air column 56. Duct 55 is connected to an upper horizontal duct 57, which is attached to the inlet end 58 of a separator 59. Separator 59 has an internal exhaust area 60, which is adapted for connection through duct 60a to blower 51. From the blower outlet the air moves to the inlet end 61 of the duct 52 for return to station 28.

A rotatable vane air lock 62 is connected to the lower end 63 of the separator 59. Air lock 62 is generally cylindrical in shape, as shown in FIG. 3, and is provided with a series of rotatable vanes 64.

ROTATING SCREEN SEPARATOR

Separator 59 can be a simple centrifugal separator (FIG. 3), but preferably a rotating screen separator (such as shown in the top portion of FIG. 5) is used. Such a separator includes a rotatably mounted cylindrical screen 59a driven by a slave drive 59s from the rotatable air lock 62a having a plurality of rotatable vanes 64a.

Screen speed is not generally sufficient to throw off articles held thereon by air. However, as the screen 59a rotates, articles at the 12 o'clock position (FIG. 5) are hit and wiped off the screen by incoming articles entrained in the airstream in duct 57. Air exits through the screen into duct 60a which feeds an input of blower 51, as noted above.

Alternately, as plastic and aluminum articles are received in a centrifugal separator 59 (FIG. 3), they engage the back wall 65 thereof and drop out into the air lock 62. From there the rotating vanes 64 progressively drop the combined plastic and aluminum articles through discharge end 66 while maintaining an essentially sealed outlet from the separator.

CLOSED LOOP SEPARATION

Accordingly, it will be appreciated that a closed loop separator 50 generates and defines a closed loop of air, and more particularly in at least one portion, an upwardly moving column of air. That column arises, from beneath the commingled moving stream of articles, up through a porous plate supporting such articles, to lift and carry off lighter aluminum and plastic articles from heavier glass articles at station 28. The lifted articles are introduced to a separator 59 for discharge while the air column is separated from the articles at the separator 59 and is returned to the blower inlet, providing a closed loop of air flow.

The blower or some other portion of the closed loop system includes an adjustable exhaust, and appropriate dust filter or skimmer 52a, for bleeding off air as described above. More particularly, it will be appreciated that it is desirable to maintain at least a slight negative pressure within the closed loop system of the closed loop separator 50. In that regard, it will be appreciated that the air velocities remain relatively high, while the pressures are kept relatively low in order to provide the negative pressure differential with respect to the pressure inside the system and the ambient pressure outside the system, so as to reduce leakage from inside to outside the system.

As an example, the velocity of the air impinged on the commingled stream on the porous surface 54 is approximately 1800–2300 feet per minute, which is sufficient to lift aluminum and plastic articles of the type found in many recycling systems, such as aluminum cans, plastic bottles and jugs. The air velocity of approximately 1800–2300 feet per minute translates to a closed moving air loop, wherein the air velocities along the loop somewhat differ, for example, from about 1500 feet per minute at the blower inlet, to about 2600 feet per minute at the inlet station 28 just beneath the porous plate 54. These ranges provide sufficient velocity and air flow in the vertical lift portion of the loop to effectively separate the constituents anticipated in the stream as described herein. Thus, while there may be a positive pressure at the fan discharge, the downstream pressure through the system falls to a negative pressure with respect to the outside air. The aforementioned bleed off, for example, may amount to about ten percent (10%), in conjunction with this operation, providing the negative internal pressure desired.

More specifically, an air flow of about 18,000 cfm with a commingled stream contacting velocity of about 1800–2000 fpm is sufficient to separate aluminum and plastic articles from glass where heavier plastic articles such as plastic liquid detergent bottles are not contemplated. When they are included, a flow of about 20,000 cfm at stream contacting velocities of about 2000–2300 fpm is preferable so these can be separated as well.

The closed air loop separator 50 differs from that separator described in U.S. Pat. No. 4,915,824 in several significant respects. First, it will be appreciated that the duct 55 defining the upwardly moving air column 56 is much narrower than that of the separator in the noted patent. In the separator in the noted patent, it will be appreciated that tobacco particles are projected, by means of vanes across the chamber within the separator. Varying air streams are impinged on the projected arc of particles to lift the lighter particles from the heavier ones. On the other hand, in the current separator, it will be appreciated that the commingled stream of glass, aluminum and plastic articles are discharged from the discharge end 44 of the vibrating screen onto the porous plate 54, where the articles slide along that plate to a discharge end 70 thereof. The remaining articles, primarily of glass at this point, are discharged onto a conveyor 71, which conveys the remaining glass to the various glass sort stations downstream. Accordingly, the articles to be separated are not projected across the closed loop, but are conveyed across the closed loop and the porous plate 54. Like the tobacco separator in the U.S. patent, the closed loop air flow is divided into a plurality of air streams, as shown in FIG. 2, by means of vanes 67 such that a first air stream 68 closer to the discharge end 44 of the screen 41 is of a faster velocity impinged across the commingled stream than a more downstream air stream portion 69 of the column moving upwardly and nearer the discharge end 70 of screen 54. However, it is believed that even a homogenious air stream moving upwardly through the plate 54 could be suitable.

Moreover, it will also be appreciated that porous plate 54 is only slightly inclined in the current invention, much less than the screen of the patent which is mounted at a much steeper angle. It is desirable to maintain the glass articles in the largest possible pieces. Having them slide down an incline at fast speeds can lead to more break up. Accordingly, the incline of plate 54 is determined to be small as reasonably possible to maintain gentle movement of the moving stream.

GLASS SEPARATION

Turning now to a further description of the glass separation feature of the system, the glass articles comprising all clear (flint), green and amber glass articles are discharged from the station 28 onto the conveyor 71 and conveyed to a plurality of manual glass sort stations 72 and 73. At stations 72, 73, individual operators pick up the various glass articles and direct them into an appropriate chute as shown in FIG. 1 at a number 74. As shown in FIG. 1, it will be appreciated that the conveyor 71 diverges into upper and lower (as seen in FIG. 1) conveyors 75 and 76, so that the combined glass streams can be broken down and expanded into two streams for efficiency of sorting. Respective chutes 74 are connected to various conveyors 77, 78 and 79 in a known fashion. Conveyor 77 receives clear (flint) glass articles from clear glass article chutes and deposits them onto a glass loading conveyor 80 for deposit into a clear (flint) glass roll-off 15. Conveyor 78 receives green glass articles from chutes receiving green glass articles from the operators at stations 72, 73 and deposits the green glass articles onto a glass load conveyor 81 for conveying green glass articles into the roll-off container 16. Conveyor 79 receives amber glass articles from chutes into which amber glass articles are deposited and conveys amber glass articles to conveyor 82, which conveys the articles for loading into the amber glass roll-off container 18. It will be appreciated that each of the roll-offs 14, 15, 16 and 18, for example, are provided with diverting chutes or conveyors 84 through 87, as shown in FIG. 1, for spreading the articles received into the respective roll-off containers 14, 15, 16 and 18.

PLASTIC AND ALUMINUM SEPARATION

Returning now to station 28, it will be appreciated that aluminum and plastic articles have been lifted at that station to a separator 59, where they are discharged through the air lock 62 (or 62a) in a commingled stream of plastic and aluminum articles into plastic-aluminum separation station 32.

In one embodiment (FIG. 3) separation station 32 includes apparatus for first separating larger plastic articles from the combined stream of plastic and aluminum and thereafter means for separating the smaller remaining plastic articles from the aluminum. After the smaller plastic articles are separated from the aluminum, the larger and smaller plastic articles are recombined for compaction, optional piercing, and collection, and the aluminum articles are separately collected.

Figure 4:
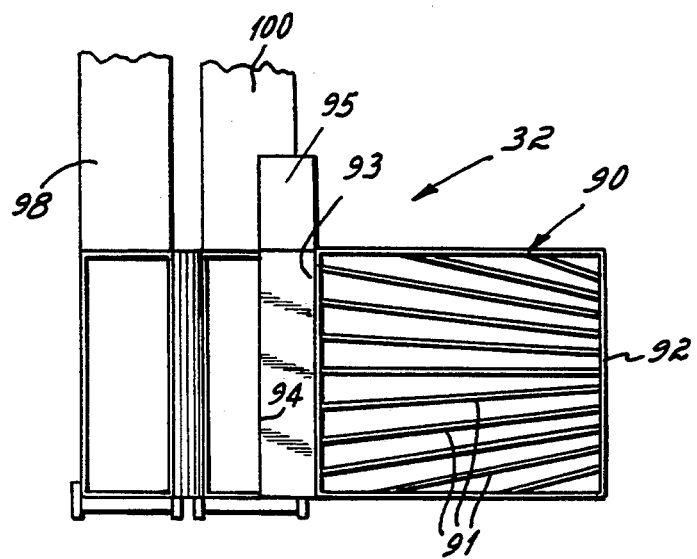
FIG. 4 is a plan view taken along lines 4—4 of FIG. 3.

The station 32 thus in one embodiment (FIG. 3, 4) comprises apparatus known colloquially as a "grizzly scalper" 90, model number GS-3660, manufactured by Griffin & Company of Louisville, Ky. This scalper includes a vibratory conveyor having, as perhaps best seen in FIG. 4, a plurality of longitudinal bars 91, which are generally parallel, but slightly diverge from an upstream end 92 to the downstream end 93. As the combined aluminum and plastic are conveyed along these bars by means of vibration of the conveyor, all smaller aluminum and plastic articles fall therethrough while the larger plastic articles such as milk jugs and large beverage containers for example, remain on top of the bars and are conveyed onto a discharge end 94 and then transversely to a discharge chute 95.

Meanwhile, the aluminum and smaller plastic articles which fall through the bars 91, land on an eddy current non-ferrous metal separator conveyor 96, where they are conveyed toward a discharge end 97 thereof. The eddy current non-ferrous metal separator is manufactured by the Eriez Company of Erie, Pa., and is known as its model number ECS-24. This particular separator has means to repel the aluminum articles. Thus as the combined aluminum and plastic articles are conveyed toward the discharge end 97, the aluminum articles are cast outwardly as shown, where they land on a conveyor 98. From conveyor 98, the aluminum articles are conveyed to conveyor 99, where they are discharged by means of the diverting chute 84 into the aluminum roll-off container 14, or to an appropriate baler of any suitable type.

The plastic articles, however, are not repelled by the non-ferrous metal separator and thus their trajectory is much shorter and they land on the closer conveyor 100. Conveyor 100 moves directly under the discharge chute 95 of the "grizzly scalper" 90, such that the larger plastic articles moving through the discharge chute 95 are discharged onto the conveyor 100 and are thus recombined with the smaller plastic articles, where they are conveyed to conveyor 101, for transfer to a compactor or baler 104 prior to discharge or loading into roll-off container 19. Any suitable compactor or baler such as baler model number HAL-7RP made by the Selco Baler Company, division of Harris Group of Baxley, Ga. Optionally, the plastic articles can be first introduced to a plastic perforator 102., and from there to a compactor or baler 104. The plastic perforator 102 serves to punch holes in the various plastic articles so as to facilitate their compaction by releasing air, etc. which might be otherwise trapped therein.

ALTERNATIVE PLASTIC AND ALUMINUM SEPARATION

Figure 6:
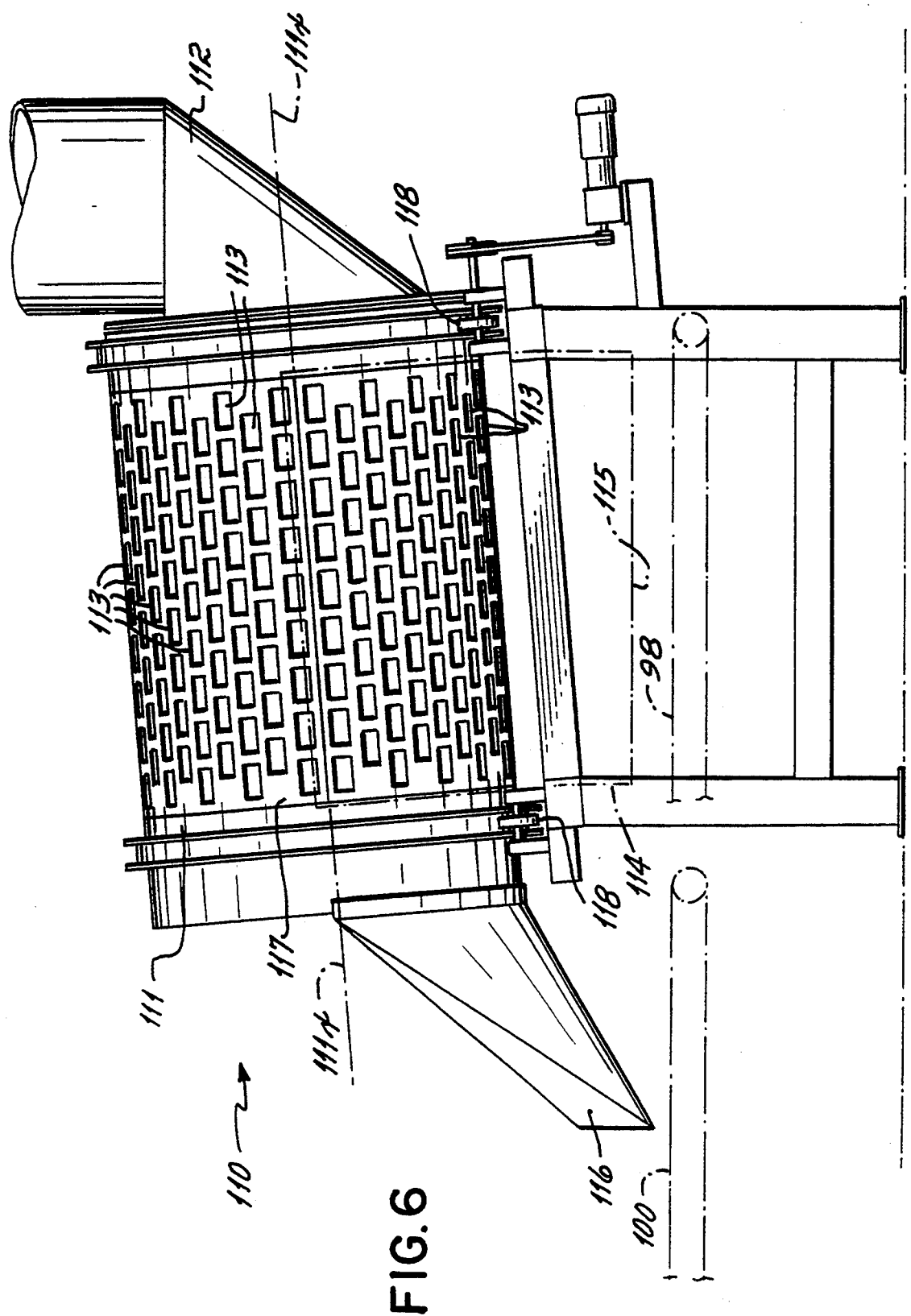
FIG. 6 is an elevational side view of the "trommel" of FIG. 5.

In another embodiment, as shown in FIGS. 5 and 6, a "trommel" 110 is used to separate plastic from aluminum articles and discharge them respectively onto conveyors 98 (aluminum) and 100 (plastic). Such a trommel is effectively used in situations where the plastic and aluminum introduced to the trommel 110 include aluminum cans, many of which may have been pre-crushed, and larger plastic items such as various forms of liquid containers. In many recycling programs the nature of the aluminum and plastic constituents can be predetermined to render this separating embodiment particularly efficient.

In this regard, trommel 110 inclines a cylindrical drum 111 mounted for rotation about a declining axis 111x. An inlet chute 112 is positioned to receive plastic and aluminum articles from separator airlock 62 or 62a and deliver them to the internal area bounded by drum 111. Openings 113 in the drum surface are sized to pass the smaller aluminum articles, but not the larger plastic articles.

As drum 111 rotates, the aluminum articles move along the drum and fall through openings 113 onto chute 114 having a discharge outlet 115 laterally spaced from beneath the drum 111 and over aluminum conveyor 98. Another chute 116 is disposed to receive larger plastic articles, discharged from lower end 117 of drum 111, and to discharge the plastic onto plastic conveyor 100.

In this manner, plastic and aluminum are lifted from the stream at station 28 and separated at station 32 by means of a trommel 110. As noted, this embodiment is particularly useful when the aluminum and plastic constituency of the stream can be predetermined with consistency and where the size of the aluminum articles and the size of the plastic articles lend themselves to efficient separation by this means.

Of course, as diagrammatically shown in FIGS. 5 and 6, the drum 111 can be mounted to ride on motor driven rollers 118 for rotation, or can be constructed or mounted in any suitable fashion.

GENERAL OPERATION

In one example of operation a commingled stream of ferrous glass, plastic and aluminum articles are deposited onto the receiving conveyor 11 and thereafter transferred by conveyor 21 into the system. Where the separator station 28 is approximately 3-4 feet wide and the air flows are as previously mentioned, such a system can be utilized to handle on the order of 10 to 15 tons per hour of commingled stream articles with the ferrous glass, plastic and aluminum articles all being separated in kind from each other by means of the apparatus at a very efficient flow rate.

Moreover, utilization of the apparatus as described provides very efficient article separation, with a minimization of other kind articles ending up in the respective collection points or roll-offs. Moreover, it will be appreciated that the closed loop separator 50 greatly facilitates the separation of aluminum and plastic articles, on the one hand, from glass articles on the other, without subjecting the glass articles to undue handling or breakage. In this regard, the discharge end 44 of the vibratory screen conveyor is located as closely as possible to porous plate 54, the discharge end 70 from the station 28 is oriented to make as gentle a transition as possible onto the conveyor 71, and plate 54 is inclined at only a minimum angle to assure gentle article stream flow. In the meantime, the air flows and velocities are sufficient to lift the aluminum and plastic articles upwardly in upwardly moving air columns.

It will be appreciated that various portions of the system 10 could be eliminated or modified as suggested herein depending, for example, on the nature and content of the commingled stream of articles. For example, if residue articles and materials are eliminated, the initial manual sorters or operators are not necessary. Where certain plastic and aluminum constituents are predicted, the trommel separator described can be used in place of the "scalper" apparatus described.

It will also be appreciated the other variations of the invention could be used. For example, the air chamber or flow station 28 could be separated into two or more chambers and respective various stream constituents lifted and separated from each other by varying air velocities of separate closed air loop portions in each respective chamber. Such a variation may render further downstream separation of the lifted constituents unnecessary.

ALTERNATIVE SYSTEM LAYOUT

Moreover, other system layouts embodying the features described above, or modifications thereof can be used.

Figure 7:
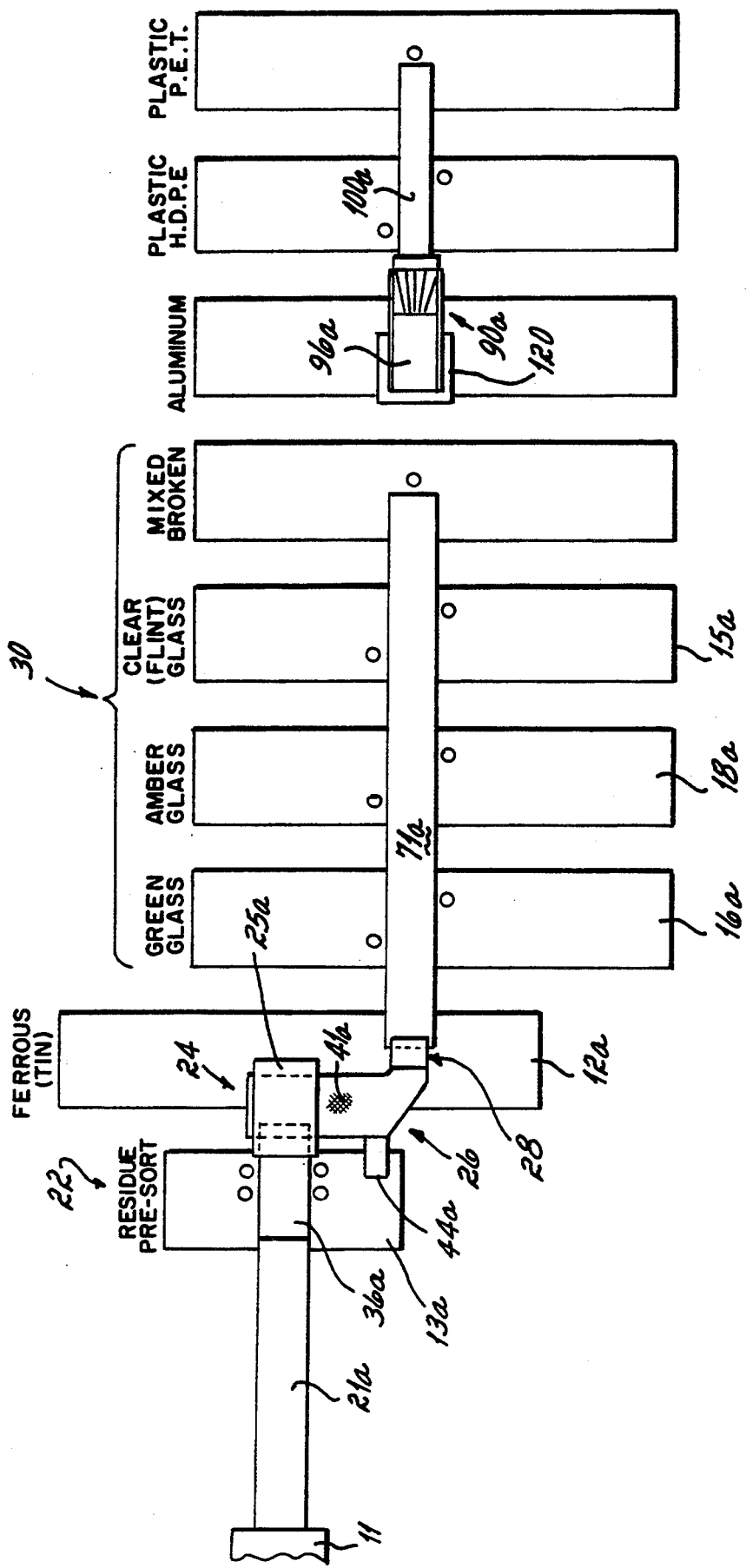
FIG. 7 is a diagrammatic plan view of an alternative layout of the invention incorporating a closed loop separator, parts thereof omitted for clarity.

For example, FIG. 7 diagrammatically illustrates an efficient layout utilizing the foregoing principles. This system is also for handling a commingled stream as noted above and utilizes a manual sort station 22, a ferrous removal station 24, a screening station 26, an aluminum/plastic lift or sort station 28, manual glass sort stations 30, and plastic and aluminum separation stations 32 functionally and essentially like those described above. These stations are numbered like those in FIGS. 1-6 since similar sortation or separation functions are performed at each.

The layout in FIG. 7 illustrates very efficient flow paths, and to accommodate these, certain orientation changes have been made in the apparatus to accommodate the different flow paths.

Incoming commingled articles are conveyed in a commingled stream on a pit conveyor 11 to incline conveyor 21a, and onto belt conveyor 36a at residue presort station 22. Thereafter, an overhead magnetic belt 25a, like that described above, is used to remove ferrous containing material into bin 12a at station 24.

At station 24, the remaining commingled stream is turned 90 degrees onto screen 41a of screening station 26 which has a discharge 44a to a residue bin 13a. At the end of the screen 41a the stream is deflected again 90 degrees and introduced to the aluminum/plastic lift or sort station 28, which forms part of a closed loop air separation apparatus essentially like that described above. In this embodiment, however, the duct work defining the closed loop is extended, as will be described, to accommodate the somewhat different orientation of the entire system. It essentially functions, however, in the same manner as in the previously described apparatus.

Turning now to the combined remaining glass articles not lifted upwardly at station 28, this glass is discharged onto a sort conveyor 71a, where it is manually sorted at station 30 into respective bins 15a, 16a and 18a as indicated. Mixed and broken glass is sorted into a mixed/broken bin as indicated.

From station 28, aluminum and plastic articles are lifted upwardly in a duct (not shown but corresponding to duct 55) forming a part of the closed loop air separation apparatus and are then conveyed horizontally in another duct (not shown but corresponding to duct 57) to a separator like that of the centrifugal or rotating separator shown in FIG. 3. This duct is disposed above conveyor 71a as shown in FIG. 7. The aluminum and plastic are then discharged from this separator to a grizzly scalper 90a (similar to scalper 90). This scalper discharges plastic articles onto a plastic conveyor 100a from where these articles can be sorted into a P.E.T. plastic bin and an H.D.P.E. plastic bin as illustrated.

Meanwhile, an eddy current non-ferrous metal separator conveyor apparatus 96a (like that of separator 96 of FIG. 3) is operable to discharge aluminum articles into a chute 120 for discharge into the aluminum bin as shown.

In the meantime, the closed loop air flow, separated from the plastic and aluminum articles, is returned to the general area of station 28 by an elongated duct (not shown but corresponding in function to duct 60a) to a fan input (not shown). This fan has an output connected via ducts (not shown but corresponding in function to ducts 61, 52) to station 28 to blow upwardly and lift aluminum and plastic articles from the commingled stream, all as noted above, in a closed loop system. Accordingly, this alternative layout envisions a different disposition of the components described previously in this application, with extended duct work utilized to provide efficient flow paths and efficient component location.

Of course, flow rates and pressures in the closed loop described are controlled to provide the separation, conveying, dust skimming, and article flow rates and functions desired, such as described with respect to the apparatus of FIGS. 1–6. Very efficient through puts, together with an efficient usage of facility floor space are thus provided.

These and other modifications and advantages will become readily apparent to those of ordinary skill in the art without departing from the scope of the invention and applicant intends to be bound only by the claims appended hereto.

We claim:

1. Apparatus for separating aluminum, plastic and glass articles from a commingled stream of such articles including:
    means for generating and defining a closed loop of moving air, a portion of which loop is directed vertically upward;
    means for introducing articles in said commingled stream to and across said vertically upward moving air, wherein said air lifts plastic and aluminum articles away from glass articles;
    means for receiving aluminum and plastic articles lifted in said closed loop from said stream;
    means for receiving glass articles not lifted from said stream;
    means for separating said lifted aluminum from lifted plastic articles received from said closed loop; and
    further including a vibrating screen conveyor carrying said commingled stream toward said loop and comprising means for separating relatively small objects from said stream, said vibrating screen conveyor having a wide portion for expanding the interface of said stream with said small object separating means, and a narrower portion downstream of the wide portion for concentrating said stream for introduction to said closed loop.

2. Apparatus for separating aluminum, plastic and glass articles from a commingled stream of such articles including:
    means for generating and defining a closed loop of moving air, a portion of which loop is directed vertically upward;
    means for introducing articles in said commingled stream to and across said vertically upward moving air, wherein said air lifts plastic and aluminum articles away from glass articles;
    means for receiving aluminum and plastic articles lifted in said closed loop from said stream;
    means for receiving glass articles not lifted from said stream;
    means for separating said lifted aluminum from lifted plastic articles received from said closed loop;
    further including means for thereafter recombining said larger plastic articles with said smaller plastic articles.

3. Apparatus for separating various components from a commingled stream of components wherein said components include a plurality of glass, plastic and aluminum articles, said apparatus comprising:
    means for conveying said commingled stream;
    means for generating a closed loop of flowing air wherein said loop has a component moving upwardly;
    said conveying means operably disposed to introduce said stream across said upwardly moving component of flowing air;
    said plastic and aluminum articles being lifted in said upwardly moving component while glass articles are not lifted;
    means for discharging lifted aluminum and plastic articles from said closed loop;
    means for separating discharged aluminum and plastic articles from each other;
    wherein said stream includes a component of residue articles; and
    wherein said conveying means includes a first commingled stream conveyor and a vibrating residue separation screen conveyor, said separation screen conveyor being wider, at an upstream portion, than said first conveyor for expanding said stream for residue separation, and then tapering to a downstream portion narrower than said wider portion to concentrate the remaining commingled stream for separation of aluminum and plastic articles from glass articles in said closed loop, 4. Recycling apparatus for separating components of a commingled stream wherein said components include at least ferrous, glass plastic and aluminum articles and reside articles, said apparatus comprising:
    first conveyor means for conveying a commingled stream to a first station;
    means for removing and collecting ferrous articles from said stream;
    vibrating screen conveyor means for removing residue articles from said stream;
    a closed loop of flowing air having an upwardly moving component;
    means for operably introducing said stream to said closed loop for separating plastic and aluminum articles from glass articles;
    means for receiving glass articles from said closed loop;
    means for discharging plastic and aluminum articles from said closed loop;
    means for separating plastic articles from aluminum articles discharged from said closed loop; and
    means for respectively collecting separated plastic, aluminum and glass articles.

5. A closed air loop separator for separating plastic and aluminum articles from glass articles, said separator comprising:
    means for establishing an upwardly moving column of air, comprising a portion of said loop, across a moving stream of commingled plastic, aluminum and glass articles, and for lifting said plastic and aluminum articles in said air column upwardly and away from moving glass articles;

means for discharging said lifted plastic and aluminum articles from said closed air loop separately form said glass articles; and wherein said separator further comprises:

air fan means;

a porous surface for receiving said stream of commingled articles;

first air duct means operably extending from said air fan means to a plenum beneath said porous surface and conveying a flow of air therethrough;

second air duct means extending upwardly from said porous surface and defining an upwardly extending column of flowing air carrying plastic and aluminum articles lifted from said commingled stream by air flowing through said porous surface;

a separator means for separating plastic and aluminum articles from said closed air loop;

third air duct means connecting said second air duct means and said flowing air column to said separator means;

said separator means having an air outlet operably connected to an air intake of said air fan means and an air lock means for discharging plastic and aluminum articles from closed air loop; and means for receiving glass articles moving from said porous surface out of said closed air loop.

6. A separator as in claim 5 further including means for dividing said flow of air into a plurality of varying velocity air streams prior to flowing through said porous surface.

7. A separator as in claim 6 wherein a higher velocity air stream is oriented to engage an upstream portion of said commingled stream of articles on said porous surface, and a lower velocity air stream is oriented to engage a downstream portion of said commingled stream of articles on said porous surface.

8. A process for separating glass, plastic and aluminum articles from a commingled, moving stream of such articles comprising:

applying an upwardly directed air flow, comprising a portion of a closed loop of flowing air, to said stream from beneath said stream;

lifting aluminum and plastic articles from said glass articles in said closed loop air flow;

collecting remaining glass articles not lifted;

separating said lifted aluminum and plastic articles from said closed loop of flowing air;

collecting lifted aluminum and plastic articles; and including the steps of first separating larger plastic articles from combined plastic and aluminum articles; then separating remaining smaller plastic articles from aluminum articles; then recombining the smaller and larger plastic articles; and then separately collecting aluminum articles and plastic articles.

* * * * *